United States Patent [19]
Southiere

[11] 3,882,948
[45] May 13, 1975

[54] STEERING COLUMN CONSTRUCTION

[75] Inventor: Bertrand Southiere, Valcourt, Canada

[73] Assignee: Bombardier Limited, Valcourt, Quebec, Canada

[22] Filed: May 9, 1973

[21] Appl. No.: 358,645

[30] Foreign Application Priority Data
May 2, 1973 Canada ................................. 170280

[52] U.S. Cl. .................................. 180/5 R; 180/21
[51] Int. Cl. ........................................... B62m 27/02
[58] Field of Search .............. 180/3 R, 5 R, 5 A, 21, 180/4, 6 R, 6 A

[56] References Cited
UNITED STATES PATENTS
3,583,507   6/1971   Trautwein ........................... 180/3 R

*Primary Examiner*—Allen N. Knowles
*Attorney, Agent, or Firm*—Fetherstonhaugh & Co.

[57] ABSTRACT

A steering mechanism for snowmobiles in which the steering column to which the steering control is affixed is coupled with the ground engaging runners or skis through a vertically extending shaft offset to one side of the steering column and rotatably mounted to the structure of the snowmobile frame.

7 Claims, 1 Drawing Figure

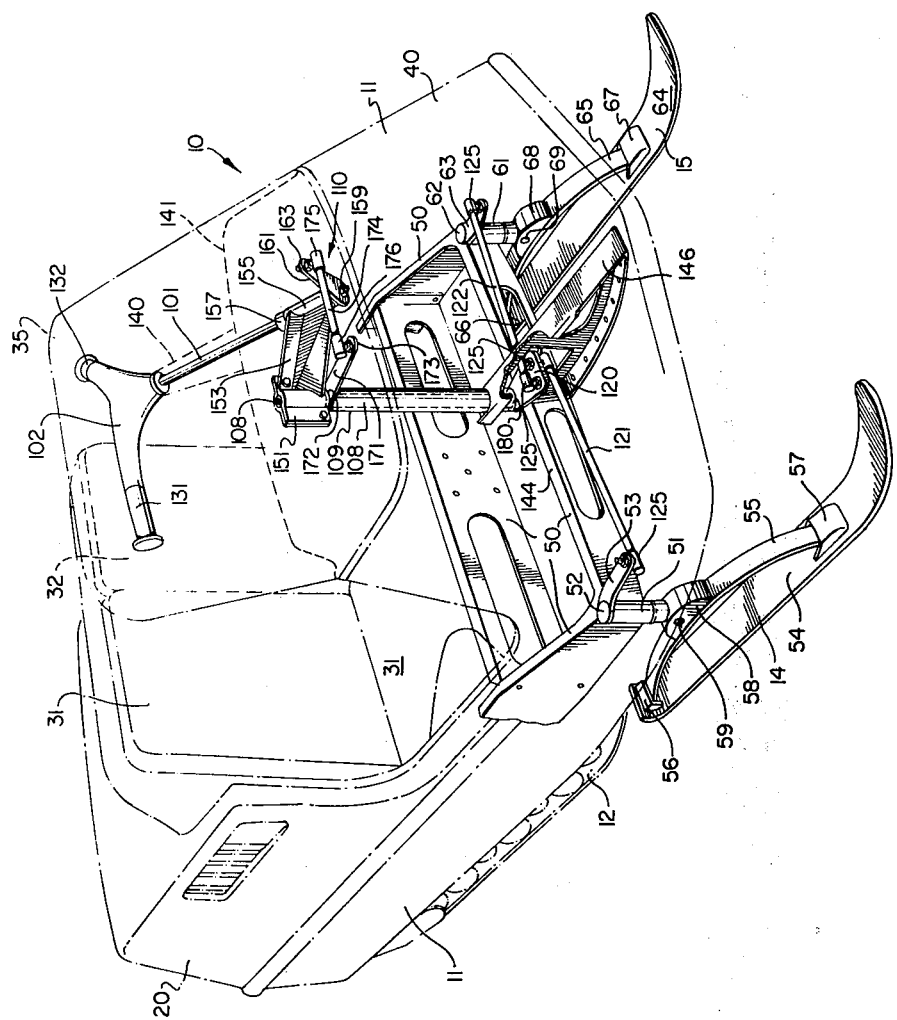

STEERING COLUMN CONSTRUCTION

This invention relates to steering mechanism as found in relatively small off-the-road vehicles and, in particular, snowmobiles in which the total angular displacement of the steering control is relatively small, that is to say not exceeding one half of one turn from lock to lock.

Conventional steering mechanisms for snowmobiles usually consist of a relatively long steering column extending from the handle bar directly to the tie rods which are pivotally connected to the crank arms of the ski legs. In front mounted engine designs, the steering column normally extends through the middle of the engine compartment and this greatly limits the choice in locating the engine and the various components which are accessory to the engine in particular the muffler system, the gas tank, etc.

The conventional extended steering column design is also a source of difficulty in the case of a rear engine snowmobile with a side-by-side seating arrangement, because of the need for sufficient leg room ahead of the seats. It has been proposed to install the steering column toward the center of the vehicle with the steering control located in front but to one side of the driver. This arrangement however, was found uncomfortable and tiring and consequently unacceptable.

The object of this invention therefore is to provide a steering system for snowmobiles which obviates the above noted disadvantages but which remains substantially as simple in design and as lightweight as the conventional straight column snowmobile steering system.

In accordance with this invention, a generally vertically extending shaft is provided which can be pivoted for transmitting motion between the steering column and the conventional tie rod system acting upon the ski legs. The lower end of the steering column is connected to the upper end of the shaft by means of two generally parallel crank arms interconnected to one another by means of a pivotally mounted tie rod.

The steering column extends generally forwardly and downwardly in a plane parallel to but spaced apart from the vertical longitudinal plane that contains the shaft.

An exemplary preferred embodiment in accordance with this invention is illustrated in the attached figures of drawings which illustrate in perspective view the general outline of a rear engine mounted snowmobile with a sitting capacity of two, arranged in a side-by-side configuration.

With reference to the drawings, a two-seater snowmobile is shown by means of reference numeral 10, which essentially comprises a body 11 supported on the ground by means of two endless tracks 12 (only one being visible in the figure), and two skis 14 and 15 disposed immediately in front of tracks 12. At the rear portion of the vehicle body 11, an engine compartment 20 is provided which houses the engine and a relatively large number of components including the transmission system, the gas tank, the electrical system, etc. (not shown). The drive system of course operates the tracks 12 for controlling the speed of the snowmobile 10, and skis 14 and 15 permit control of the direction of travel of the vehicle. In the intermediate region of the body 11, seats 31 and 32 are provided for accommodating the operator of the snowmobile and a passenger sitting to its right side. A protective windshield 35 is disposed in front of the driver and passenger and immediately below windshield 35 is the nose portion 40 of body 11 which accommodates the feet of the passenger and of the driver. Below the foot areas, one finds the forward end of the frame structure 50 including ski leg housings 51 and 61 suitably secured to the frame structure 50. Ski legs 52 and 62 extend through housings 51 and 61 respectively and interconnect steering arms 53 and 63 to the corresponding ski or, in general, the ground contacting direction element 14, 15. In accordance with conventional design, each ski assembly includes a ski 54, 64 to which is connected a leaf spring 55, 65 by means of a rear pivot connection 56, 66 and a front shackle or slide connection 57, 67 the details of which have been omitted in the interest of clarity. A spring coupler 58, 68 pivotally connects the middle portion of leaf spring 55, 65 to the lower end of ski leg 52, 62 such as to allow rocking motion of the ski assemblies 14, 15 around horizontal pin 59, 69.

The steering mechanism comprises a steering column 101, a steering control or handlebar 102 fixed to the upper end of steering column 101, a generally vertically extending shaft 108 pivotally mounted to an upright structure 109 which is illustrated as a hollow post but which could be U-shaped in section, and link means 110 interconnecting the steering column 101 to the upper end of shaft 108, and a conventional system of link means including common crank arm 120 and tie rods 121, 122 coupling the lower end of shaft 108 to the steering arms 53, 63 of the ski assemblies 14 and 15. Ball joints 125 provide the necessary pivotal connections of the tie rods 121, 122 to arms 123, 53 and 63. Although not shown, adjustment will be used for aligning skis 54, 64 which must be parallel when in the median, straight ahead position.

Handlebar 102 which is rigidly connected to the upper end of steering column 101 provides handgrips 131 and 132 for the operator of the snowmobile and as in conventional snowmobile designs handgrips 131 and 132 serve to mount a throttle control and a brake control (not shown).

Steering column 101 is disposed directly in front of the driver's seat 32 and extends generally forwardly and downwardly in a longitudinally extending vertical place spaced apart from the median longitudinal vertical plane of vehice 10. The details of the mounting of the upper end of the steering column 101 have been omitted to simplify the drawing and to facilitate understanding. In practice, a housing 140 will extend over the visible portion of column 101 and will be secured to dash panel 141 which is secured to or forms part of body 11 of the snowmobile, and a suitable bushing (not shown) within housing 140 rotatably supports the upper end of steering column 101.

Hollow or U-shaped structure 109 consists of a relatively strong steel member secured at its lower end to cross member 144 of frame 50, and further strength is provided by means of structural component 146 connected to cross members 144 and to post 109 although the primary function of component 146 is to support the nose portion of the lower body panel of frame 11. The head portion 151 of post 109 is secured to dash panel 141 for more strength to this forward portion of body 11.

Hollow or U-shaped structure 109 and its head portion 151 support a bracket 153 which in turn carries a bushing 155 through which the cover end of steering column 101 extends with just sufficient clearance for rotation of column 101. A thrust washer or ring 157 fixed to column 101 bears against the upper end of bushing 155. The lower end of steering column 101 is threaded, and a nut 159 holds crank arm 161 in fixed position to steering column 101 but against the other end of bushing 155. With the arrangement, when handlebar 102 is turned one way or the other around the axis of steering column 101, the free end 163 of crank arm 161 describes an arc of similar angular extent.

A crank arm 171 connected to the upper portion of shaft 108 projects through a slot 172 therein generally in the same direction as crank arm 161. In other words, crank arms 171 and 161 extend in parallel but spaced apart vertical planes. Their respective free end 163 and 173 are kept a fixed distance apart by means of a tie rod 174 and ball joints 175, 176.

The common crank arm 120 is likewise secured at its inner end to shaft 108 near the lower end thereof, and projects forwardly through an arcuate slot or opening 180 in hollow structure 109. As noted hereinabove, element 109 can be a post of U-shaped cross-section opening forwardly thereby permitting passage of the crank arms. The arrangement has not been illustrated but it should be quite clear that hollow structure 109 may be opened on one face without losing too much strength. This alternative construction may facilitate assembly.

With this arrangement, it has been found that the presence of a steering control directly in front of the operator no longer interferes with legroom and, in addition, hollow structure 109 which can easily be hidden and padded for safety gives considerable strength to the forward body portion of the snowmobile's structure particularly when use is made of large fiber glass or molded plastic body panels.

I claim:

1. A steering mechanism for a relatively small off-the-road vehicle comprising a steering control for manual operation by the operator of said vehicle, ground contacting direction elements angularly displaceable relative to the longitudinal axis of said vehicle for varying the direction of travel of said vehicle, and link means for interconnecting said steering controls and said direction elements to relate the angular position of said direction elements to the angular position of said steering control, said link means comprising a steering column extending generally forwardly and downwardly in a vertical plane extending parallel to the longitudinal centerline of the vehicle, carrying at its upper rear end said steering control, and mounted to the structure of said vehicle in a freely rotatable manner, and a generally vertically extending shaft mounted to said structure in a freely rotatable manner and disposed in a vertical plane parallel to and spaced apart from said first mentioned plane, the lower end of the column being located forward of a transverse plane through the axis of said vertical shaft, a generally upright leg member for each said direction element, crank arm and tie rod means interconnecting the lower end of said shaft with each leg member such that rotation of said shaft causes angular displacement of said direction element which, however, always remain generally parallel to one another, a first crank arm secured to the lower free end of said steering column and extending forwardly therefrom, a second crank arm secured to the upper end of said shaft and extending forwardly therefrom and a tie rod extending transversely across in front of both said column and said shaft and pivotally interconnecting said first and second crank arms, said crank arm and tie rod means and said first and second crank arms being positioned and dimensioned such that when said steering control is at the middle point of its total angular displacement, said direction elements extend parallel to the longitudinal axis of said vehicle.

2. In a snowmobile comprising two side-by-side seats, in a frame supported on the gournd by means of a pair of endless tracks and a pair of skis disposed forwardly of said track, a steering system comprising a steering control adapted to be operated by the operator of the snowmobile and located immediately in front of the seat thereof, a steering column extending generally forwardly and downwardly and mounting at its upper rear end said steering control and supported to the structure of said snowmobile in a freely rotatable manner, said steering column lying in a vertical plane parallel to the longitudinal centerline of the snowmobile, a first crank arm secured to the lower end of said steering column and extending forwardly therefrom perpendicularly thereof and perpendicularly to said steering control, a first tie rod having one end pivotally connected to the free end of said crank arm, a generally vertically extending shaft mounted to said structure in a freely rotatable manner in a vertical plane parallel to and spaced apart from the said plane that contains said steering column, the lower end of the steering column being located forward of a transverse plane through the axis of said shaft, said shaft having at its upper end a second crank arm extending generally forwardly in the same direction as said first crank arm but perpendicularly to said shaft, and connected to said first tie rod at the other end thereof, the first tie rod thus extending across in front of both said column and said shaft, a third crank arm secured to the lower end of said shaft and extending perpendicularly thereof and generally along the longitudinal axis of said snowmobile, second and third tie rods having one end each pivotally connected to the free end of said third crank arm, fourth and fifth cranks arms respectively connected to a different one of said skis and generally extending in the same direction as said third crank arm and each being pivotally connected to the free ends of a different one of said second and third tie rods, whereby the angular position of said steering control determines the angular relationship of said skis relative to the longitudinal axis of said snowmobile and whereby said second and third tie rods maintain said skis generally parallel to one another.

3. A steering system for snowmobiles comprising hand control means located directly in front of the operator's seat, steering column means for mounting said hand control means and rotatable around its axis in either direction from a median position through a predetermined maximum angle of about 45° for a lock-to-lock angle of about 90°, at least one ski assembly adapted to bear against the surface of the ground generally in the forward region of said frame and pivotally mounted to said frame by means of an upstanding ski leg for steering said snowmobile when in motion, and motion transmitting means for coupling said steering column means to said ski leg to relate the steer angle of said ski assembly to the angular position of said hand control means, said motion transmitting means comprising a generally vertically extending bar mounted to said frame in a vertical plane generally parallel to and spaced apart from a vertical plane extending parallel to the longitudinal centerline of the snowmobile and containing said steering column means, the lower end of the steering column means being located forwardly of the axis of said vertically extending bar, said bar having its lower end coupled to said ski leg for rotation therewith, said motion transmitting means further comprising the combination of two crank arms and a tie rod pivotally interconnecting said crank arms, the first crank arm being secured to said steering column means adjacent its free end and extending forwardly therefrom, the second crank arm being secured to the upper end of said bar and extending forwardly therefrom, and said tie rod thus extending across in front of both said steering column means and said vertically extending bar.

4. A steering system as defined in claim 3 wherein said snowmobile comprises two ski assemblies, each pivotally mounted to said frame by means of an upstanding ski leg, said ski assemblies being interconnected by means of a third and fourth crank arms with tie rod means pivotally connected to said third and fourth crank arms.

5. A steering system as defined in claim 4 wherein the lower end of said bar carries a fifth crank arm projecting generally in the same direction as said third and fourth crank arms, said tie rod means interconnecting third, fourth and fifth crank arms whereby to maintain said ski assemblies generally parallel to one another and in a direction related to the angular position of said hand control means.

6. A steering system as defined in claim 5 wherein said bar consists of a first shaft rotatably mounted within a hollow post secured to said frame, said steering column means consisting of a second shaft extending forwardly and slightly downwardly, the lower end of said second shaft being rotatably supported to said frame by means of a bushing secured to the upper part of said hollow post by means of a bracket.

7. A steering system as defined in claim 6 wherein said hollow post consists of an upright member having a U-shaped cross-section.

* * * * *